United States Patent [19]
Kurita et al.

[11] Patent Number: 5,998,055
[45] Date of Patent: Dec. 7, 1999

[54] GAS-PASSAGE PLATES OF A FUEL CELL

[75] Inventors: Kenji Kurita, Nagoya; Katsuhiro Kajio, Anjo, both of Japan

[73] Assignee: Aisin Seiki Kabushiki Kaisha, Kariya, Japan

[21] Appl. No.: 08/907,009

[22] Filed: Aug. 6, 1997

[30] Foreign Application Priority Data

Aug. 8, 1996 [JP] Japan .................................... 8-210235
Jul. 23, 1997 [JP] Japan .................................... 9-197174

[51] Int. Cl.$^6$ .............................. H01M 8/10; H01M 8/02
[52] U.S. Cl. ................................................ 429/34; 429/33
[58] Field of Search ........................................ 429/34, 33

[56] References Cited

U.S. PATENT DOCUMENTS

| | | |
|---|---|---|
| 4,743,518 | 5/1988 | Romanowski ............................. 429/34 |
| 4,977,041 | 12/1990 | Shiozawa et al. ...................... 429/34 X |
| 5,300,370 | 4/1994 | Washington et al. . | |

FOREIGN PATENT DOCUMENTS

| | | |
|---|---|---|
| 6-86730 | 3/1994 | Japan . |
| 6-96781 | 4/1994 | Japan . |
| 6-215780 | 8/1994 | Japan . |

*Primary Examiner*—John S. Maples
*Attorney, Agent, or Firm*—Oblon, Spivak, McClelland, Maier & Neustadt, P.C.

[57] ABSTRACT

Gas passages of a gas-passage plate disposed between fuel cells are improved, in order to enhance gas utilization efficiency and output performance. The supply-gas passages formed on the gas-passage plate on a surface to face one gaseous diffusion electrode comprise an inlet-side channel part, an outlet-side channel part, and an intermediate channel part which connects the inlet-side channel part and the outlet-side channel part. The inlet-side channel part and the outlet-side channel part are lattice-shaped passages. The intermediate channel part has the shape of being folded plural times, and comprises groups of a plurality of straight independent passages, and lattice-shaped passages formed at portions returning from one independent-passages group to the next independent-passages group.

4 Claims, 4 Drawing Sheets

GAS-PASSAGE PLATES OF A FUEL CELL

BACKGROUND OF THE INVENTION

1. Field of the Invention

The present invention relates to gas-passage plates of a solid polymer electrolyte type fuel cell.

2. Description of the Related Art

With regard to the configuration of this type of fuel cell, a pair of catalyst-carrying gaseous diffusion electrodes are overlaid on both main surfaces of an ion-conductive solid polymer electrolyte membrane (hereinafter, referred to as a solid electrolyte membrane), thereby producing a power generating cell. In order to obtain a desired voltage output by connecting a plurality of these single power generating cells in series, the plurality of power generating cells are stacked with a separator interposed between neighboring two power generating cells. In this case, the separator has electric conductivity and functions as a current collector of two diffusion electrodes disposed on both the sides of the separator.

When a fuel gas and an oxidation gas are respectively supplied on both the sides of the separator so as to supply the fuel gas and the oxidation gas to respective gaseous diffusion electrodes, ionic conduction proceeds at solid electrolyte membranes and chemical reactions proceed at the respective gaseous diffusion electrodes. A voltage is thereby generated between a pair of gaseous diffusion electrodes, and output to an outside circuit through a pair of separators which are disposed on both ends and serve as current collectors. In generating power, how uniformly the supply gases are supplied on electrode surfaces of the gaseous diffusion electrodes determines gas utilization ratios, and directly affects power generating efficiency and output performance.

However, when the supply gases are supplied to the entire surfaces of the gaseous diffusion electrodes, there are no contact areas of the separators and the gaseous diffusion electrodes, and accordingly it becomes difficult to collect a generated electric current efficiently and remove heat generated at the gaseous diffusion electrodes. Therefore, at boundary portions of the separators and the gaseous diffusion electrodes, channels are formed so as to restrict the flow directions of the supply gases, and certain ratios of contact areas of the separators and the gaseous diffusion electrodes are secured. Since these channels are generally formed on the separators, the separators will be referred to as gas-passage plates hereinafter in this specification. All types of separators including a separator comprised of a plurality of component parts will be referred to as gas-passage plates.

By the way in the above fuel cells, in order to make ion conductivity of the solid electrolyte membranes exhibited fully and to keep power generating efficiency high, the supply gases (the fuel gas and the oxidation gas) are humidified and water vapor concentrations are increased in the supply gases.

Moreover, the solid polymer electrolyte-type fuel cells function to convert the energy of the electrochemical reaction of hydrogen and oxygen forming water into electrical energy, water is produced at the cathode. (Depending on the type of membrane, a certain liquid is produced at the anode.)

Consequently, in the above channels for the supply gases, a large amount of water generated from the reaction is contained in the downstream, especially on the outlet side, and there is a fear that liquidified water fills the gas channels and causes flooding.

In order to prevent the supply gases from stagnating due to the reaction-generated water, various types of gas channels have been proposed, as disclosed in the publications of Japanese Unexamined Publication (KOKAI) Nos. H6-215,780, H6-96,781, and H6-86,730. The gas channels disclosed in these publications are roughly classified into three types. In the first type the contact surfaces of one gas-passage plate and one electrode are regularly dotted and the gas passages have the shape of a lattice. The second type includes gas passages and contact surfaces arranged in stripes. In the third type the gas passage is a single path extending from an inlet port to an outlet port.

All of these passage types have advantages and disadvantages. The channel in the form of a lattice does not cause flooding, but does not positively allow gaseous diffusion or water discharge. The channel in the form of stripes is simple in structure, but has problems with gas supply and water dischargeability. The channel in the form of a single path secures a high gas flow speed and attains superior gaseous diffusivity, but pressure loss (passage resistance) is increased and accordingly initial pressure at a gas supply apparatus must be increased and the electric power balance sheet of this system does not necessarily improve.

SUMMARY OF THE PRESENT INVENTION

The present invention has been conceived in view of the above problems of the related art.

It is an object of the present invention to provide a gas flow technique with which gaseous diffusivity and output performance can be improved and a burden does not have to be imposed on a gas supply apparatus.

The inventors of the present invention have found that the above object can be attained by forming lattice-shaped passages on the inlet side and the outlet side, and connecting the lattice-shaped passages by an intermediate channel part comprising a group of plural independent passages in the shape of stripes.

Gas-passage plates of a fuel cell according to the present invention are a pair of gas-passage plates each having a channel which guides a supply gas comprising either of a fuel gas and an oxidation gas to either of a pair of gaseous diffusion electrodes, pinching an electrolyte membrane, on a surface opposing to the solid electrolyte membrane, so that the supply gas flows from an inlet side to an outlet side of each of the gas-passage plates, wherein the channel of at least one of the gas-passage plates comprises an inlet-side channel part which is disposed on the inlet side, an outlet-side channel part which is disposed on the outlet side, and an intermediate channel part which is disposed between the inlet-side channel part and the outlet-side channel part, the inlet-side channel part and the outlet-side channel part respectively being lattice-shaped passages, and at least part of the intermediate channel part being a plurality of parallel independent passages.

The gas-passage plates of a fuel cell according to the present invention have the following functions.

Because the inlet-side supply-gas channel part and the outlet-side supply-gas channel part have the shape of a lattice, the contact area of one supply gas with one electrode is large, and the supply gas can freely move and contact the electrode in a short time. Therefore, at the inlet-side channel part, the efficiency of contacting the supply gas with the electrode is high (i.e., the contact area is large and the contacting speed is high), and a loss in gaseous diffusivity on the inlet side can be prevented. Further, at the outlet-side channel part, a loss in gaseous diffusivity can be prevented in the same way as at the inlet-side channel part, and because the cross-sectional area of the passages is large, it is possible to secure water dischargeability and prevent flooding.

At least part of the intermediate channel part which connects the inlet-side channel part and the outlet-side channel part comprises a group of plural independent passages. Owing to this configuration, while the problem of pressure loss which is observed in the channel in the form of a single path is dissolved, superior gaseous diffusivity can be secured because the gas flow rate is increased in the respective independent passages. In addition, because of the high gas flow rate at the intermediate channel part, the supply gas can be delivered with pressure to the outlet-side channel part and accordingly, water dischargeability is improved.

DETAILED DESCRIPTION OF THE PRESENT INVENTION

The channel of at least one of a pair of gas-passage plates of a fuel cell according to the present invention comprises an inlet-side channel part which is disposed on the inlet side, an outlet-side channel part which is disposed on the outlet side, and an intermediate channel part which is disposed between the inlet-side channel part and the outlet-side channel part. The inlet-side channel part and the outlet-side channel part are lattice-shaped passages, and at least part of the intermediate channel part is a plurality of parallel independent passages. The inlet-side channel part and the outlet-side channel part respectively communicate with an inlet manifold and an outlet manifold formed along the respective sides of the gas-passage plate.

In the gas-passage plate of this construction, owing to the lattice-shaped passages, one gas introduced into the inlet-side channel part freely moves and contacts one electrode in a short time, thereby increasing gaseous diffusivity. Moreover, when the distance between adjoining two passages of the inlet-side channel part is the same as the width of each passage of the intermediate channel part, the contact efficiency in terms of contact area is also high.

As for the intermediate channel part, because of the group of independent passages, the gas flow direction is uniformly restricted, and as a result, the gas flows constantly and water dischargeability is enhanced. Further, because the gas flow rate is increased, gas utilization efficiency is also improved. In addition, because the gas channel comprises a plurality of gas passages, pressure loss is decreased.

In regard to the outlet-side channel part, the gas flowing at a high flow rate is introduced, and water dischargeability is excellent because of the lattice-shaped passages. These facts enhance the effect of preventing water from stagnating. In addition, the gas contact efficiency in terms of time and contact area is improved in the same way as at the inlet-side channel part.

In the gas-passage plate of a fuel cell according to the present invention, the intermediate channel part may have the shape of being folded a plurality of times and comprise straight portions and curved portions. By constituting the curved portions with lattice-shaped passages, pressure loss (passage resistance) can be decreased while gaseous diffusivity at the curved portions is secured.

It is preferable that the intermediate channel part has a smaller cross-sectional area of the total gas passages toward the outlet-side channel part. Therefore, a higher flow rate is obtained toward the outlet side (the downstream), whereby the gaseous diffusivity and water dischargeability become excellent.

As described in the above, the present invention has the following advantages. Owing to the gas passage shape of the present invention, water dischargeability is excellent especially at the outlet side and the entire gaseous diffusivity is superior. Accordingly, a high gas utilization ratio and a decrease in passage resistance can be realized and the output performance can be improved.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

PREFERRED EMBODIMENTS OF THE PRESENT INVENTION

Now, gas-passage plates of a fuel cell according to preferred embodiments of the present invention will be described concretely with reference to the drawings.

The First Preferred Embodiment

Figure 1:
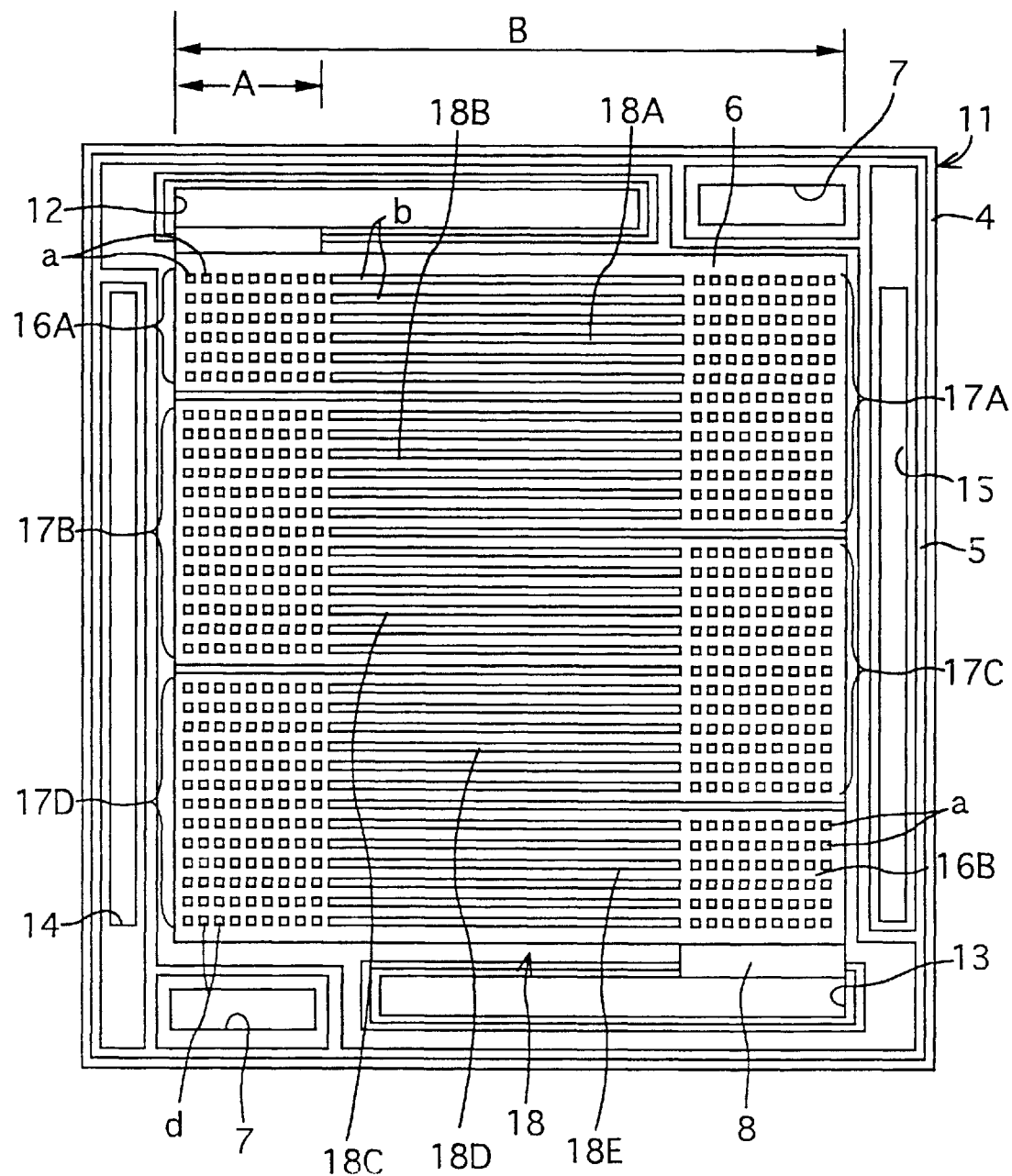
FIG. 1 is a plan view of a gas-passage plate of a fuel cell according to a first preferred embodiment of the present invention.
Figure 2:
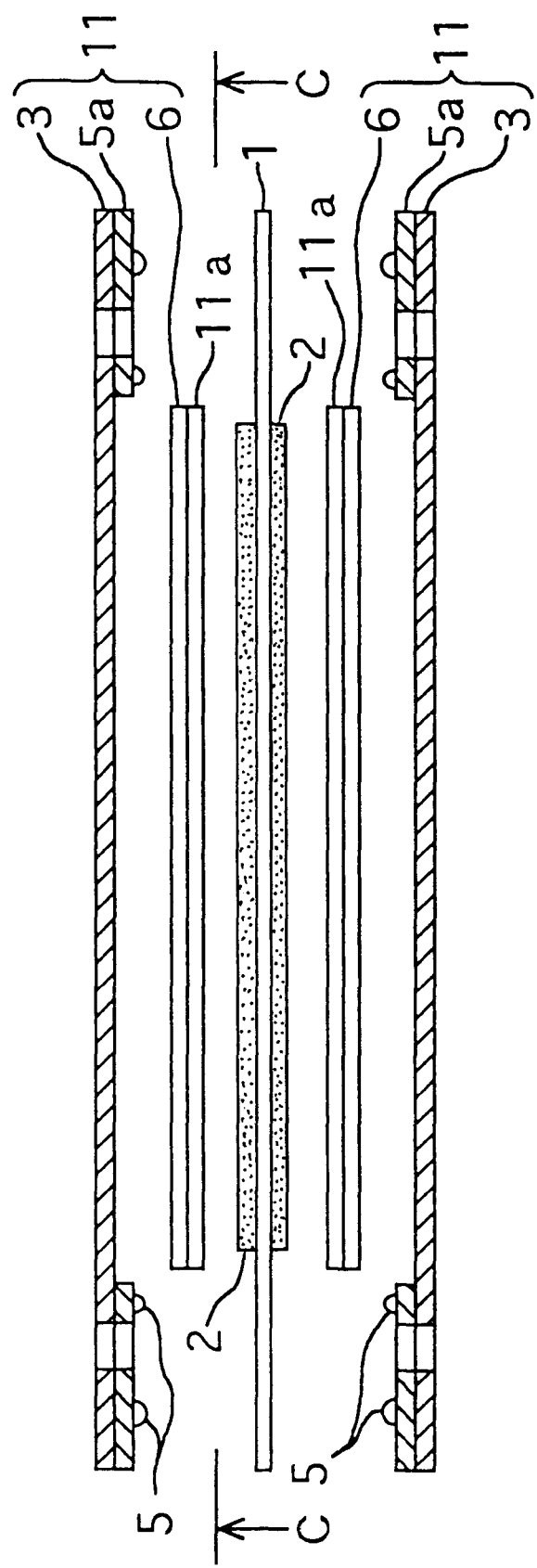
FIG. 2 is a cross-sectional view of the entire fuel cell to which the present invention is applied.

Referring to FIGS. 1 and 2, gas-passage plates 11, 11 of a fuel cell according to the present invention are to be respectively contacted under pressure with surfaces of gaseous diffusion electrodes 2, 2 (shown in FIG. 2) which are connected to a solid electrolyte membrane 1 in a manner to pinch the solid electrolyte membrane 1. In this preferred embodiment, the respective gas-passage plates 11, 11 comprise passage members 6, 6 having passages 6a, 6a which guide gases along surfaces of the gaseous diffusion electrodes 2, 2, a pair of metal separators 3, 3 (shown in FIG. 2) which are contacted with outer surfaces of the respective passage members 6, 6 and press the passage members 6, 6 against the gaseous diffusion electrodes 2, 2. The solid electrolyte membrane 1, the pair of gaseous diffusion electrodes 2, 2, and the gas-passage plates 1, 11 constitute one power generating cell.

FIG. 1 is a cross-sectional view taken in an outward direction along line C—C of FIG. 2, showing one gas-passage plate, for example, for an oxidation gas. One passage member 6 of the gas-passage plate 11 has a rectangular shape in conformity with the shape of one gaseous diffusion electrode 2, and is formed of carbon or metal which has gas impermeability and electric conductivity. The gas-passage plate 11 is disposed inside of an inlet manifold 12 and an outlet manifold 13 which are formed along sides of the rectangular metal separator 3. The oxidation gas is introduced from the inlet manifold 12, passed through the passages 6a, and discharged from the outlet manifold 13. As for the other gas-passage plate 11 for a fuel gas, the fuel gas is introduced and discharged from an inlet manifold 14 and an outlet manifold 15 which are formed along sides other from those along which an inlet manifold 12 and an outlet manifold 13 for the oxidation gas are formed. The inlet manifold 12 and the outlet manifold 13 for the oxidation gas and the inlet manifold 14 and the outlet manifold 15 for the fuel gas are made to be independent gas passages by beads 5 glued on gasket surfaces, and kept air-tight. Along the sides of the gas passage plate 11, a path 7 for cooling water is also formed so as not to interrupt the respective manifolds.

The above passages 6a comprise an inlet-side channel part 16A which communicates directly with the inlet manifold 12, an outlet-side channel part 16B which communicates directly with the outlet manifold 13, and an intermediate channel part 18 which connects the inlet-side channel part 16A and the outlet-side channel part 16B.

The inlet-side channel part 16A and the outlet-side channel part 16B are formed in the shape of a lattice. The intermediate channel part 18 are formed in the shape of being folded a plurality of times, and comprises groups 18A to 18E of independent passages which extend in the shape of a plurality of straight lines, and lattice-shaped passages formed at returning portions 17A to 17D. That is to say, in the inlet-side channel part 16A and the outlet-side channel part 16B, the areas except isolated projections aligned vertically and horizontally are gas passages, and in the independent-passages groups 18A to 18E, the areas except elongated projections b are gas passages. In the lattice-shaped passages at the returning portions 17A to 17D, the areas except isolated projections d are gas passages.

The ratio of the length A of the inlet-side channel part 16A to the total length B is preferably 1 to 5–6.

In this preferred embodiment, one of the supply gases from the inlet manifold 12 enters the inlet-side channel part 16A with relatively small resistance. This is because the inlet-side channel part 16A is lattice-shaped passages. Owing to the initial pressure provided by the gas supply apparatus, the supply gas freely flows through the lattice-shaped passages and contacts one electrode in a short time. When the lattice-shaped passages have the same passage width as the independent-passages group 18A of the following intermediate channel part 18, the contact area of the gas with the electrode is increased. Thereby, the electrode usage ratio (gas contact efficiency) on the inlet side is improved.

It was confirmed that when the ratio of the length A of the inlet-side channel part 16A to the total length B is set at 1:5–6, the electrode usage ratio is the highest. The ratio of the length of each of the returning portions and the length of the outlet-side channel part 16B to the total length B may be the same as the above ratio.

In the intermediate channel part 18, a constantly high gas flow rate and a high gas utilization ratio are attained mainly by the independent-passages groups 18A to 18E. At the same time, pressure loss is decreased by making the gas passages plural. The returning portions 17A to 17D have an effect of maintaining gaseous diffusivity which is observed at the independent-passages groups 18A to 18E by making passage resistance lower than those of the independent-passages groups 18A to 18E.

In the outlet-side channel part 16B, stagnated water is discharged by the gas flowing at a high flow rate from the final independent-passages group 18E, and at the same time, gaseous diffusivity is improved in terms of passage cross-sectional area and time, in the same way as in the inlet-side channel part 16A.

The Second Preferred Embodiment

Figure 3:
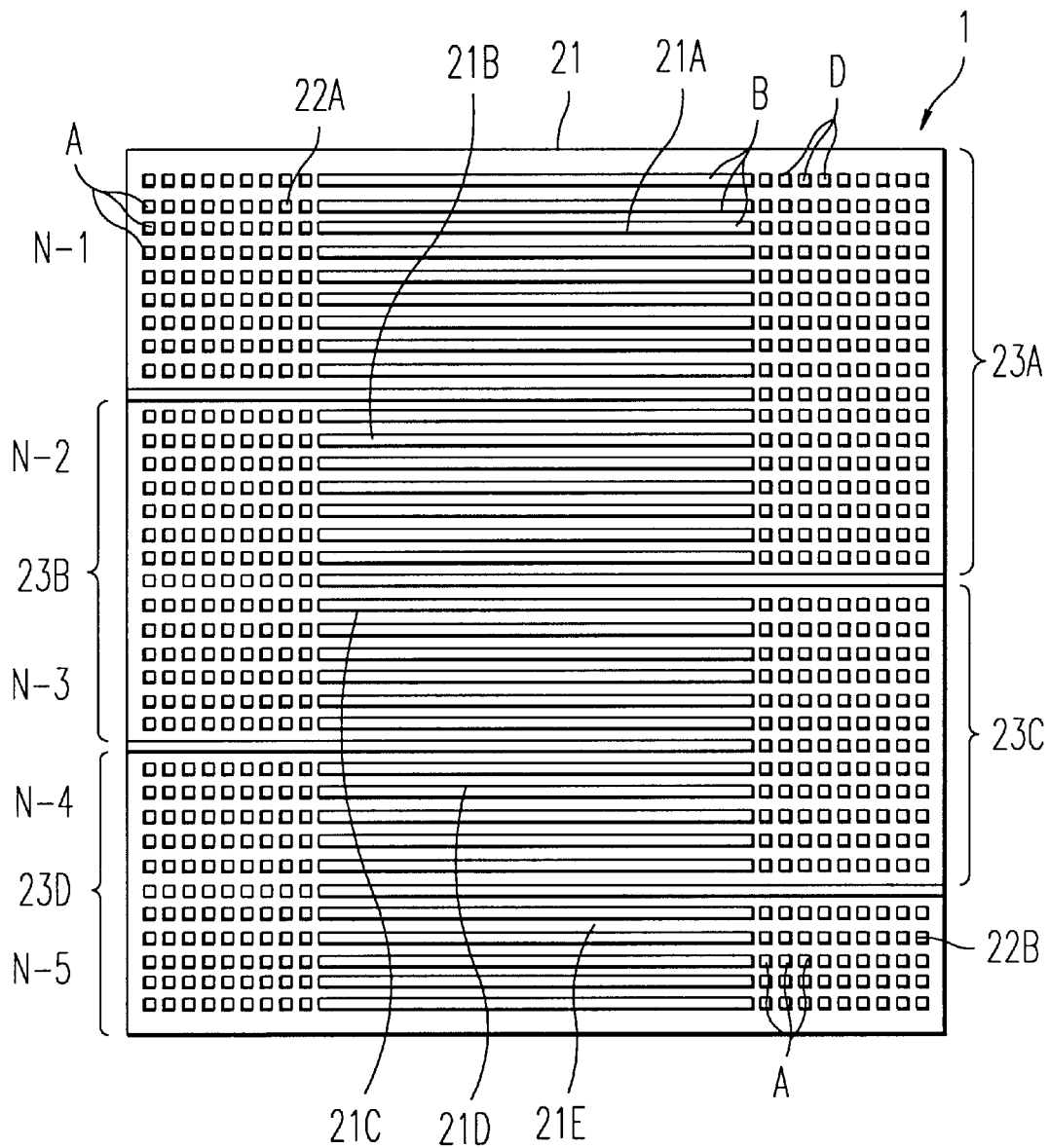
FIG. 3 is a plan view of a gas-passage plate of a fuel cell according to a second preferred embodiment of the present invention.

FIG. 3 shows a passage member 6' of one gas-passage plate of a fuel cell according to a second preferred embodiment of the present invention. As shown in FIG. 3, in the gas-passage plate of the fuel cell of this preferred embodiment, the cross-sectional area of the total passages of each of the independent-passages groups 21A to 21E of the intermediate channel part 21 is smaller toward the outlet-side channel part 22B. In particular, the cross-sectional area of each passage of each of the groups 21A to 21E is constant, but the number of passages in each of the groups 21A to 21E is decreased toward the outlet-side channel part 22B. That is to say, referring to FIG. 3, when the number of passages of the independent-passages group 21A which connects the inlet-side channel part 22A with the lattice-shaped passages of the first returning portion 23A is n, the independent-passages group 21B which connects the lattice-shaped passages of the first returning portion 23A with the lattice-shaped passages of the second returning portion 23B is constituted by n-1 of passages. Similarly, the independent-passages group 21C which connects the lattice-shaped passages of the second returning portion 23B with those of the third returning portion 23C is constituted by n-2 of passages The rest is constituted in a similar way, and the independent-passages group 21E which connects the lattice-shaped passages of the last returning portion 23D with the outlet-side channel part 22b is constituted by n-5 of passages.

By thus decreasing the number of passages of the intermediate channel part 21 toward the downstream, the flow rate of the gas flowing into the outlet-side channel part 22B can be increased in comparison with that in the case where the number of passages are constant as in the first preferred embodiment, and water dischargeability is enhanced without increasing the volume of supply gas or pressure loss.

Figure 4:
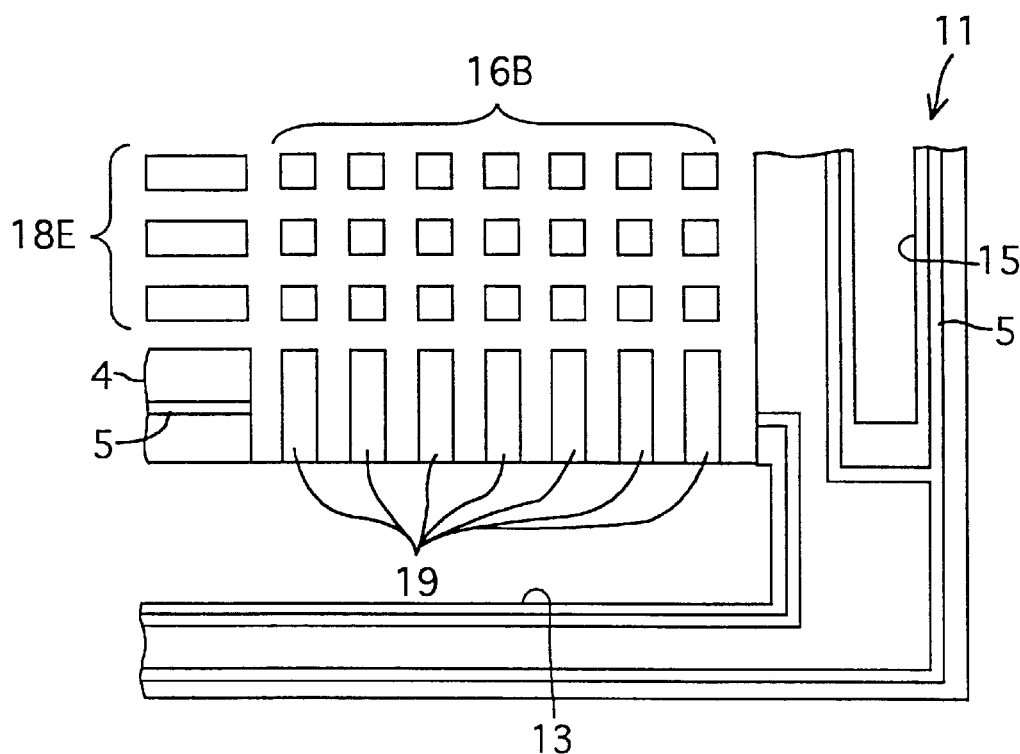
FIG. 4 is a modification of an inlet-side channel part or an outlet-side channel part according to the preferred embodiments of the present invention.
Figure 5:
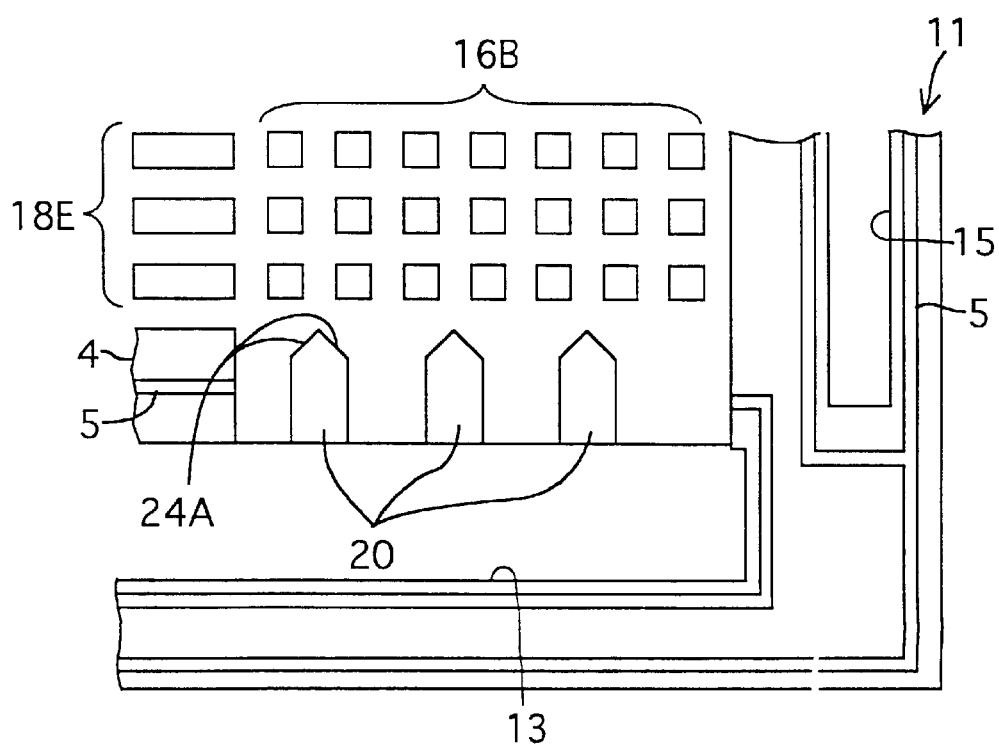
FIG. 5 is another modification of the inlet-side channel part or the outlet-side channel part according to the preferred embodiments of the present invention.

In the above preferred embodiments, as shown in FIG. 4 or 5, a rib group 19 or 20 may be formed at an adjoining portion of the outlet-side channel part 22B to the outlet manifold 13 (at the portion indicated by numeral 8 in FIG. 1). The rib group 19 or 20 is constituted by stripe-shaped passages extending for a short length in the direction of the gas facing the outlet manifold 13, instead of the same lattice-shaped passages as those of the outlet-side channel part 22B. With this configuration, one supply gas flows smoothly to the outlet manifold 13, and water dischargeability is also improved. The rib group 20 is characterized in that split slant surfaces 20A are formed on a surface facing to the gas flow.

Similar ribs can also be formed in the inlet-side channel part 16A.

Moreover, the gas-passage plate may be produced integrally with a metal separator.

Obviously many modifications and variations of the present invention are possible in the light of the above teachings. It is therefore to be understood that within the scope of the appended claims, the invention may be practiced otherwise than is specifically described.

What is claimed is:

1. Gas-passage plates of a fuel cell, which are a pair of gas-passage plates each having a channel which guides a supply gas comprising either of a fuel gas and an oxidation gas to either of a pair of gaseous diffusion electrodes, pinching a solid electrolyte membrane, on a surface opposing to said solid electrolyte membrane, so that said supply gas flows from an inlet-side to an outlet-side of each of said gas-passage plates, wherein said channel of at least one of said gas-passage plates comprises an inlet-side channel part which is disposed on said inlet side, an outlet-side channel part which is disposed on said outlet side, and an intermediate channel part which is disposed between said inlet-side channel part and said outlet-side channel part, said inlet-side channel part and said outlet-side channel part being respectively lattice-shaped passages, and at least part of said intermediate channel part being a plurality of parallel independent passages.

2. Gas-passage plates of a fuel cell according to claim 1, wherein said intermediate channel part comprises straight portions extending from one side to the other side of said channel, and returning portions returning at said respective sides.

3. Gas-passage plates of a fuel cell according to claim 2, wherein said straight portions of said intermediate channel part are said independent passages, and said returning portions of said intermediate channel part are lattice-shaped passages.

4. Gas-passage plates of a fuel cell according to claim 1, wherein said plurality of parallel independent passages of said intermediate channel part has a smaller total cross-sectional area toward said outlet-side channel part, than toward said inlet-side channel part.

* * * * *